(12) United States Patent
Bokhari et al.

(10) Patent No.: US 8,394,892 B2
(45) Date of Patent: Mar. 12, 2013

(54) HIGH PERFORMANCE THERMOPLASTIC ELASTOMER COMPOSITION

(75) Inventors: Nadeem Akhtar Bokhari, Troy, MI (US); Kousuke Ohtani, Ichihara (JP); Yasuhito Ijichi, Sodegaura (JP)

(73) Assignee: Sumitomo Chemical Company, Ltd., Tokyo (JP)

( * ) Notice: Subject to any disclaimer, the term of this patent is extended or adjusted under 35 U.S.C. 154(b) by 199 days.

(21) Appl. No.: 12/559,223

(22) Filed: Sep. 14, 2009

(65) Prior Publication Data

US 2011/0065865 A1   Mar. 17, 2011

(51) Int. Cl.
*C08L 23/04* (2006.01)
*C08L 53/00* (2006.01)
*C08L 53/02* (2006.01)

(52) U.S. Cl. ............... 525/89; 525/96; 525/98

(58) Field of Classification Search ............. 525/89, 525/96, 98
See application file for complete search history.

(56) References Cited

U.S. PATENT DOCUMENTS

| | | | |
|---|---|---|---|
| 3,333,024 A | 7/1967 | Haefele et al. | |
| 4,068,027 A | 1/1978 | Van Ornum | |
| 4,501,857 A | 2/1985 | Kishimoto et al. | |
| 4,775,711 A * | 10/1988 | Kawamura et al. | 524/232 |
| 5,358,986 A | 10/1994 | Onofusa et al. | |
| 5,629,371 A * | 5/1997 | Kitagawa et al. | 524/505 |
| 6,316,068 B1 * | 11/2001 | Masubuchi et al. | 428/35.7 |
| 6,815,508 B1 * | 11/2004 | Terano et al. | 525/323 |
| 6,919,407 B2 | 7/2005 | Tau et al. | |
| 6,946,535 B2 | 9/2005 | Tau et al. | |
| 7,041,765 B2 | 5/2006 | Tau et al. | |
| 7,115,689 B2 | 10/2006 | Coalter, III et al. | |
| 7,238,759 B2 | 7/2007 | Stevens et al. | |
| 7,459,500 B2 | 12/2008 | Tau et al. | |
| 2003/0019782 A1 | 1/2003 | Angelopoulos et al. | |
| 2004/0127128 A1 * | 7/2004 | Thomas | 442/361 |
| 2005/0135963 A1 * | 6/2005 | Rodriguez et al. | 422/20 |
| 2008/0150261 A1 | 6/2008 | Van Tschammer et al. | |
| 2009/0270561 A1 | 10/2009 | Ohtani et al. | |

FOREIGN PATENT DOCUMENTS

| | | |
|---|---|---|
| EP | 1 453 912 B1 | 3/2008 |
| EP | 2 031 018 A1 | 3/2009 |
| JP | 42-8704 | 12/1963 |
| JP | 40-23798 | 8/1965 |
| JP | 60079005 | 5/1985 |
| JP | 08-27331 | 1/1996 |
| JP | 9-194651 | 7/1997 |
| JP | 2000-72937 | 3/2000 |
| JP | 2008-45037 | 2/2008 |
| WO | WO 03/040202 A2 | 5/2003 |

OTHER PUBLICATIONS

Jenkins A. D., et al. "Glossary of Basic Terms in Polymer Science", Pure Appl. Chem., 1996, vol. 68, No. 8, pp. 1591-1595.
Wright, T. et al. "Enhancement of the High-Temperature Properties of an SEBS Thermoplastic Elastomer by Chemical Modification", Journal of Applied Polymer Science, 2002, vol. 86, pp. 1203-1210.

* cited by examiner

*Primary Examiner* — Jeffrey Mullis

(74) *Attorney, Agent, or Firm* — Foley & Lardner LLP

(57) ABSTRACT

The present invention provides a thermoplastic elastomer composition comprising: 100 parts by weight of component (A), 10 to 100 parts by weight of component (B), 50 to 200 parts by weight of component (C), and 5 to 30 parts by weight of component (D). Component (A) is a propylene polymer having a melting point of 155° C. or more. Component (B) is a crystalline propylene-ethylene copolymer. Component (C) is an ethylene-α-olefin rubber having Mooney Viscosity of 30 to 100($ML_{1+4}$, 125° C.). Component (D) is a hydrogenated product of block copolymer comprising blocks of aromatic vinyl compound units and blocks of conjugated diene compound units.

13 Claims, No Drawings

HIGH PERFORMANCE THERMOPLASTIC ELASTOMER COMPOSITION

BACKGROUND OF THE INVENTION

1. Field of the Invention

The present invention relates to a thermoplastic elastomer composition.

2. Description of the Related Art

Air bag covers of automobile air bag systems require stiffness suited for each application such as a driver's sheet and passenger's sheets, high tensile breaking elongation so as not to cause cleavage of air bag covers at the portion other than a tear line, a thin-wall portion of air bag covers formed so as to cause cleavage of air bag covers upon their expansion, low-temperature impact strength so as to withstand use in cold climates, and also appearance suited for automobile interior components.

Injection-molded articles obtained from using a polyolefinic thermoplastic elastomer composition have not been satisfactory in their releasability for it often takes a long time to remove the molded article from the mold. In addition, the appearances of the injection molded articles have not been fully satisfactory because of luster unevenness often generated at the tear line portion and too high gloss often found in them.

SUMMARY OF THE INVENTION

An object of the present invention is to provide a polyolefinic thermoplastic elastomer composition suitable for the production of an injection molded article, which can be readily removed from the mold and has excellent appearance.

In one aspect, there is a thermoplastic elastomer composition comprising four components (A), (B), (C), and (D). Component (A) is present at 100 parts by weight; component B is present at from 10 to 100 parts by weight; component C is present at from 50 to 200 parts by weight; and component (D) is present at from 5 to 30 parts by weight.

In one aspect, there is a thermoplastic elastomer composition comprising components (A), (B), (C), and (D), wherein the ratio of (B):(A) is from 1:1 to 1:10, the ratio of (C):(A) is from 1:2 to 2:1, the ratio of (D):(A) is from 1:20 to 3:10.

In one aspect, there is a thermoplastic elastomer composition comprising from about 23 to about 61% by weight of component (A), from about 2 to about 60% by weight of component (B), from about 11 to about 47% by weight of component (C), and from about 1 to about 19% by weight of component (D). In some embodiments, component (D) is present at about 1 to about 10% by weight.

In some embodiments, the thermoplastic elastomer composition comprises an additional component (E). Component (E) is a compound selected from the group consisting of: a fatty acid having 5 or more carbon atoms, metal salts of a fatty acid having 5 or more carbon atoms, fatty acid amides having 5 or more carbon atoms, and esters of fatty acids having 5 or more carbon atoms. When component (E) is present, it may be present at a ratio of E to the sum of components (A), (B), (C) and (D) that is from 1:10,000 to 15:1,000. In some embodiments, component (E) is present up to about 1% by weight.

Component (A) is a propylene polymer having a melting temperature of 155° C. or more as measured by differential scanning calorimetry. Component (A) itself contains from 70 to 95% by weight of component (A1) and 30 to 5% by weight of component (A2) per 100% by weight of component (A).

Component (A1) is selected from a propylene homopolymer, propylene copolymer comprising propylene units and monomer units, the monomer being at least one selected from the group consisting of ethylene and α-olefin having 4 or more carbon atoms, and a mixture of the aforementioned propylene homopolymer and the propylene copolymer where the propylene copolymer contains 90% or more by weight of propylene units per 100% by weight of component (A1).

Component (A2) is an ethylene-α-olefin copolymer containing from 20 to 50% by weight of ethylene units per 100% by weight of the component (A2).

Component (B) is a crystalline propylene-ethylene copolymer having (a) a melting temperature of 80 to 130° C. as measured by differential scanning calorimetry, and (b) melt flow rate of from 1 g/10 min. to 100 g/10 min (temperature: 230° C., load: 21.18N), and contains 70 to 97% by weight of propylene units (B1), and from 30 to 3% by weight of ethylene units (B2), wherein the total amount of (B1) and (B2) is 100% by weight.

Component (C) is ethylene-α-olefin rubber having Mooney Viscosity of from 30 to 100 ($ML_{1+4}$, 125° C.), and contains from 50 to 80% by weight of ethylene units (C1), and from 50 to 20% by weight of α-olefin units (C2), wherein the total amount of (C1) and (C2) is 100% by weight.

Component (D) is the hydrogenated product of a block copolymer comprising blocks composed of aromatic vinyl compound units and blocks composed of conjugated diene compound units, the hydrogenated product having a weight-average molecular weight [Mw] of 50,000 or more, and contains from 15 to 40% by weight of aromatic vinyl compound units (D1), and from 85 to 60% by weight of conjugated diene compound units (D2), wherein the total amount of (D1) and (D2) is 100% by weight.

In some embodiments, the component (B) is a crystalline propylene-ethylene copolymer having threo type structure.

In some embodiments, component (A) has a [ηcxs] to [ηcxis] ratio from about 1.3 to about 8, where [ηcxs] is intrinsic viscosity (135° C., tetraline) of at 20° C. xylene solubles of component (A), and [ηcxis] is intrinsic viscosity (135° C., tetraline) of xylene insolubles at 20° C. of component (A).

In some embodiments, component (C) has a Mooney Viscosity of from 30 to 100 ($ML_{1+4}$, 125° C.).

In some embodiments, the total amount of (A1) and (A2) is 100% by weight of component (A). In some embodiments, the total amount of (B1) and (B2) is 100% by weight of component (B). In some embodiments, the total amount of (C1) and (C2) is 100% by weight of component (C). In some embodiments, the total amount of (D1) and (D2) is 100% by weight of component (D). In some embodiments, the total amount of (A1) and (A2) is 100% by weight of component (A), the total amount of (B1) and (B2) is 100% by weight of component (B), the total amount of (C1) and (C2) is 100% by weight of component (C), and the total amount of (D1) and (D2) is 100% by weight of component (D).

The present polyolefinic thermoplastic elastomer compositions are suitable for the production of an injection molded article that can be readily removed from a mold and has excellent appearance.

DETAILED DESCRIPTION

A monomer unit(s) (e.g. ethylene units, propylene units, α-olefin units, aromatic vinyl compound units, and conjugated diene units) in this specification means a structural unit(s) that is derived from the monomer and constituting a polymer chain.

Component (A) is a polypropylene polymer containing two components (A1) and (A2). Component (A1) is selected from propylene homopolymer, propylene copolymer comprising propylene units and monomer units, the monomer units being at least one selected from the group consisting of ethylene and α-olefin having 4 or more carbon atoms, and a mixture of the homopolymer and the copolymer, and containing 90% or more by weight of propylene units per 100% by weight of component (A1). Component (A2) is an ethylene-α-olefin copolymer containing from 20 to 50% by weight of ethylene units per 100% by weight of the component (A2).

The copolymer of the component (A1) is a copolymer comprising propylene units and monomer units, which monomer is at least one selected from the group consisting of ethylene and an α-olefin having 4 or more carbon atoms.

Examples of the α-olefin having 4 or more carbon atoms include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 4-methyl-1-pentene, 2-ethyl-1-hexene and 2, 2, 4-trimethyl-1-pentene. In some embodiment, the α-olefin having 4 to 10 carbon atoms is selected from 1-butene, 1-hexene, and 1-octene. These α-olefins may be used alone or two or more of them may be used together.

Examples of the component (A1) include a propylene homopolymer, a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, a propylene-ethylene-1-octene copolymer, and a mixture thereof. In some embodiments, component (A1) is selected from a propylene homopolymer, a copolymer of propylene and at least one monomer selected from the monomer group consisting of ethylene and an α-olefin having 4 to 10 carbon atoms, and a mixture thereof.

The content of the propylene monomer units (propylene units) of the copolymer of the component (A1) is 90% by weight or more per 100% by weight of the copolymer. In some embodiments, the content of the propylene monomer units is 95% by weight or more. In some embodiments, the content of the propylene monomer units is 98% by weight or more. It has been observed that with increasing concentration of propylene units, molded articles have improved heat resistance and stiffness. The contents of the ethylene monomer units (ethylene units) and the α-olefin-monomer units having 4 or more carbon atoms (α-olefin units having 4 or more carbon atoms) are 10% by weight or less per 100% by weight of the copolymer. In some embodiments, the contents of the ethylene monomer units and the α-olefin-monomer units having 4 or more carbon atoms is 5% by weight or less. In some embodiments, the contents of the ethylene monomer units and the α-olefin-monomer units having 4 or more carbon atoms is 2% by weight or less. It has been observed that with decreasing concentration of the ethylene monomer units and the α-olefin-monomer units having 4 or more carbon atoms, the molded article has an improvement in heat resistance and stiffness. The contents of the propylene units, the ethylene units and the α-olefin units having 4 or more carbon atoms can be determined by infrared spectroscopy.

The ethylene-α-olefin copolymer of the component (A2) is a copolymer having ethylene units and α-olefin monomer units (α-olefin units). Examples of the α-olefin include: propylene, 1-butene, 2-methylpropylene, 1-pentene, 3-methyl-1-butene, 1-hexene, 4-methyl-1-pentene, and 1-octene. In some embodiments, an α-olefin having 3 to 10 carbon atoms may be used. In some embodiments, an α-olefin having 3 to 8 carbon atoms such as propylene, 1-butene, 1-hexene, and 1-octene may be used. The α-olefin may be used alone or as a mixture of α-olefins.

Examples of the ethylene-α-olefin copolymer of the component (A2) include an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer and an ethylene-propylene-1-octene copolymer. In some embodiments, a copolymer of an α-olefin having 3 to 10 carbon atoms and ethylene may be used.

The content of the ethylene units in the ethylene-α-olefin copolymer of the component (A2) is 20% by weight or more per 100% by weight of the copolymer. In some embodiments, the content of the ethylene units in the ethylene-α-olefin copolymer of the component (A2) is 25% by weight or more. In some embodiments, the content of the ethylene units in the ethylene-α-olefin copolymer of the component (A2) is 30% by weight or more. It has been observed that with increasing concentration of ethylene units of the ethylene-α-olefin copolymer above 20% by weight, the molded article has increased low-temperature impact strength. In some embodiments, the content of the ethylene units is 50% by weight or less. In some embodiments, the content of the ethylene units is 48% by weight or less. In some embodiments, the content of the ethylene units is 45% by weight or less. It has been observed that with decreasing concentration of ethylene units of the ethylene-α-olefin copolymer below 50% by weight, the molded article has increased low-temperature impact.

The content of the α-olefin units in the ethylene-α-olefin copolymer of the component (A2) may be 80% by weight or less per 100% by weight of the copolymer. In some embodiments, the content of the α-olefin units in the ethylene-α-olefin copolymer of the component (A2) may be 75% by weight or less. In some embodiments, the content of the α-olefin units in the ethylene-α-olefin copolymer of the component (A2) may be 70% by weight or less. It has been observed that with decreasing concentration of the α-olefin units in the ethylene-α-olefin copolymer below 80% by weight, the molded article has increased low-temperature impact strength. In some embodiments, the content of the α-olefin units is 50% by weight or more. In some embodiments, the content of the α-olefin units in the ethylene-α-olefin copolymer is 52% by weight or more. In some embodiments, the content of the α-olefin units is 55% by weight or more. It has been observed that with increasing content of α-olefin units above 50% by weight, the molded article has increased low-temperature impact strength. The contents of the ethylene units and the α-olefin units can be determined by infrared spectroscopy.

The content of component (A1) in component (A) is from 70 to 95% by weight and the content of component (A2) is from 30 to 5% by weight. In one aspect, an improvement in appearance and low-temperature impact strength of the molded article may be obtained. This may be obtained by adjusting the content of component (A1) from 75 to 93% by weight, and the content of component (A2) from 25 to 17% by weight. In some embodiments, the content of component (A1) is from 80 to 90% by weight, and the content of the component (A2) is from 20 to 10% by weight per 100% by weight of component (A).

In some embodiments, component (A) is a polypropylene polymer which does not have a threo form (—$CHCH_3$—$CHCH_3$ structure). It is considered that the threo form (—$CHCH_3$—$CHCH_3$ structure) is formed by 2,1-bonding of propylene to a polymer chain end having 1,2-bonded propylene such that a methyl group at the polymer chain end and a methyl group of propylene to be subsequently polymerized take an opposite configuration along the polymer chain in propylene polymerization.

The threo form —CHCH$_3$—CHCH$_3$ structure can be observed by signals attributed to two methyl carbons of the threo form —CHCH$_3$—CHCH$_3$, which appear in a $^{13}$C spectrum measured by carbon nuclear magnetic resonance ($^{13}$C—NMR). Two signals attributed to the two methyl carbons are observed at about 15 ppm as described in academic documents "Macromolecules", (USA), American Chemical Society, 1994, Vol. 27, p. 7538-7543; and "Macromolecules", (USA), American Chemical Society, 1999, Vol. 32, p. 8383-8290. An intensity ratio of the two signals is usually from 0.5 to 1.5 as the ratio of peak areas of a higher magnetic field/peak area of a lower magnetic field.

In some embodiments, component (A) may be a polymer having a ratio of intrinsic viscosity (([ηcxs]/[ηcxis]) 135° C., tetralin) of a component soluble in xylene at 20° C. [ηcxs] to intrinsic viscosity (135° C., tetralin) of a component insoluble in xylene at 20° C. ranging from about 1.3 to about 8. In some embodiments, the polymer ratio of intrinsic viscosity (([ηcxs]/[ηcxis]) 135° C., tetralin) of a component soluble in xylene at 20° C. [ηcxs] to intrinsic viscosity (135° C., tetralin) of a component insoluble in xylene at 20° C. is in the range of from 1.5 to 7. It has been observed that the narrower range of polymer ratio results in a molded article with improved appearance.

The intrinsic viscosity is determined by the following procedure. Reduced viscosity was measured in tetralin at 135° C. using an Uberhode-type viscometer and the intrinsic viscosity was calculated in accordance with the method described in "Polymer Solution, Polymer Experiments Vol. 11 (Kobunshi Yoeki, Kobunshi Jikkengaku 11) page 491 (published by Kyoritsu Shuppan Co., Ltd. in 1982), that is, by an extrapolation method. The xylene soluble portion (CXS portion) at 20° C. and the xylene insoluble portion (CXIS portion) at 20° C. can be obtained by the following method. After completely dissolving about 5 g of the component (A) in 500 ml of boiling xylene, the xylene solution is gradually cooled to room temperature and conditioning is carried out at 20° C. for 4 or more hours, and then the precipitate and the solution are separated by filtration. The CXS portion can be obtained by removing the solvent from the filtrate solution and recovering the polymer dissolved in the solution.

In some embodiments, component (A) has a melting temperature of 155° C. or higher. In some embodiments component (A) has a melting temperature of 160° C. or higher. It has been observed that when component A has a melting temperature higher than 155° C., the mold releasability of the molded article improves. In some embodiments, the melting temperature is 175° C. or lower. The melting temperature is a peak temperature of an endothermic peak at which a peak temperature is the highest in a differential scanning calorimetry curve upon heating measured by a differential scanning calorimeter. The differential scanning calorimetry curve is measured by a differential scanning calorimeter. The melting temperature is determined from the differential scanning calorimetry curve by a heating operation described hereafter.

Measuring Conditions

Temperature falling operation: After melting at 220° C., temperature falling is carried out within a range from 220 to −90° C. at a temperature falling rate of 5° C./min.

Temperature rising operation: Immediately after the temperature falling operation, temperature rising is carried out within a range from −90 to 200° C. at a temperature rising rate of 5° C./min.

In one embodiment, component (A) has a melt flow rate of from 10 g/10 min to 300 g/10 min (230° C., 21.18 N). In one embodiment, component (A) has a melt flow rate of from 20 g/10 min to 200 g/10 min (230° C., 21.18 N). It has been observed that a molded article's appearance and tensile breaking elongation improves when the melt flow rate is from 20 g/10 min to 200 g/10 min. The melt flow rate is measured under at a temperature of 230° C. and a load of 21.18 N in accordance with JIS K7210.

The polypropylene polymer of component (A) may be prepared, for example, by a known polymerization methods using a catalysts for olefin polymerization. For example, a multistage polymerization method using a Ziegler-Natta catalyst can be used. As the multistage polymerization method, for example, a slurry polymerization method, a solution polymerization method, a bulk polymerization method, vapor phase polymerization method and the like can be used, and two or more kinds of these methods can be used in combination. Commercially available products can also be used.

Component (B) is a propylene-ethylene copolymer. The content of the propylene unit in component (B) is from 70 to 97% by weight. In some embodiments, the content of the propylene unit is from 75 to 97% by weight. In some embodiments, the content of the propylene unit is from 80 to 97% by weight. In some embodiments, the content of the propylene unit is from 85 to 97% by weight. The content of the ethylene unit in component (B) is from 30 to 3% by weight. In some embodiments, the content of the ethylene unit is from 25 to 3% by weight. In some embodiments, the content of the ethylene unit is from 20 to 3% by weight. In some embodiments, the content of the ethylene unit is from 15 to 3% by weight. In the various embodiments, the amount of the propylene-ethylene copolymer is 100% by weight for component (B). The content of the propylene and ethylene units can be determined by infrared spectroscopy.

In some embodiments, component (B) has a melting temperature of from 80 to 130° C. In some embodiments, component (B) has a melting temperature of from 85 to 130° C. In some embodiments, component (B) has a melting temperature of from 90 to 130° C. The melting temperature is a peak temperature of an endothermic peak at which a peak temperature is the highest in a differential scanning calorimetry cure upon heating measured by a differential scanning calorimeter. A method for measuring a melting temperature of component (B) is the same as that employed for measuring the melting temperature of component (A).

In some embodiments, the propylene-ethylene copolymer of component (B) is crystalline, and the heat of crystallization of component (B) is 20 mJ/mg or more. In some embodiments, the heat of crystallization of component (B) is 100 mJ/mg or less. The heat of crystallization can be determined from an area of an exothermic peak to be measured by a heat flux type differential scanning calorimeter. Specifically, a differential scanning calorimetry curve obtained by carrying out temperature falling of a copolymer within a range from 220 to −90° C. at a temperature falling rate of 5° C./min is measured, and the heat of crystallization can be obtained from an area surrounded by the resulting differential scanning calorimetry curve and a base line.

In some embodiments, component (B) is a propylene-ethylene copolymer having a threo form (—CHCH$_3$—CHCH$_3$ structure). The threo form (—CHCH$_3$—CHCH$_3$ structure) can be observed by signals attributed to two methyl carbons of the threo form (—CHCH$_3$—CHCH$_3$), which appear in a $^{13}$C spectrum, as described above.

In some embodiments, component (B) has a melt flow rate of from 1 g/10 min to 100 g/10 min(temperature: 230° C., load: 21.18 N). In some embodiments, component (B) has a melt flow rate from 10 g/10 min to 80 g/10 min. In some embodiments, component (B) has a melt flow rate from 15 g/10 min to 50 g/10 min. It has been observed that the molded article has an improved appearance and tensile breaking elongation when component (B) has a melt flow rate from 15 g/10 min to 50 g/10 min. The melt flow rate is measured at a temperature of 230° C. and a load of 21.18 N in accordance with JIS K7210.

The propylene-ethylene copolymer of component (B) may be prepared by a slurry polymerization method, a solution polymerization method, a bulk polymerization method, a vapor phase polymerization method, and the like using a non-metallocene complex catalyst such as a heteroaryl ligand catalyst described WO 2003/040202 A2, which is hereby incorporated by reference in its entirety. It is also possible to use commercially available products.

The ethylene-α-olefin rubber of component (C) is a copolymer rubber having ethylene units and α-olefin units. Examples of the α-olefin include propylene, 1-butene, 2-methylpropylene, 1-pentene, 3-methyl-1-butene, 1-hexene, 4-methyl-1-pentene and 1-octene. In some embodiments, an α-olefin having 3 to 10 carbon atoms is used. In some embodiments, component (C) is selected from propylene, 1-butene, 1-hexene and 1-octene. The α-olefin may be used alone or in combination of two or more of them.

The ethylene-α-olefin rubber may contain, in addition to ethylene units and α-olefin units, other monomer units such as a nonconjugated diene-based monomer unit (nonconjugated diene units). Examples of the nonconjugated diene include chain nonconjugated dienes such as 1,4-hexadiene, 1,6-octadiene, 2-methyl-1,5-hexadiene, 6-methyl-1,5-heptadiene, and 7-methyl-1,6-octadiene, and cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene. In some embodiments, the nonconjugated diene is selected from 5-ethylidene-2-norbornene and dicyclopentadiene.

Examples of the ethylene-α-olefin rubber of component (C) include an ethylene-α-olefin copolymer, an ethylene-α-olefin-nonconjugated diene copolymer, or a mixture thereof. Examples of the ethylene-α-olefin copolymer include an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, and an ethylene-propylene-1-octene copolymer. Examples of the ethylene-α-olefin-nonconjugated diene copolymer include an ethylene-propylene-5-ethylidene-2-norbornene copolymer, an ethylene-propylene-dicyclopentadiene copolymer, an ethylene-propylene-1,4-hexadiene copolymer, and an ethylene-propylene-5-vinyl-2-norbornene copolymer. The ethylene-α-olefin rubber may be used alone or in combination of two or more of them.

The content of the ethylene units in the copolymer of component (C) is 50% by weight or more. In some embodiments, the content of the ethylene units is 55% by weight or more. In some embodiments, the content of the ethylene units is 60% by weight or more. In some embodiments, the content of the ethylene units is 65% by weight or more. It has been observed that the molded article possesses improved mold releasability with increasing ethylene unit for component (C). The content of the ethylene units in the copolymer of component (C) can be 80% by weight or less. In some embodiments, the content of the ethylene units is 75% by weight or less. In some embodiments, the content of the ethylene units is 70% by weight or less. It has been observed that the molded article' low-temperature impact strength increases when the content of the ethylene content is 70% by weight or less.

The content of the α-olefin units in component (C) is 50% by weight or less. In some embodiments, the α-olefin units in component (C) is 45% by weight or less. In some embodiments, the α-olefin units in component (C) is 40% by weight or less. In some embodiments, the α-olefin units in component (C) is 35% by weight or less. It has been observed that the molded article's mold releasability and appearance improves when the α-olefin units of component (C) are reduced. In some embodiments, the content of the α-olefin unit is 20% by weight or more. In some embodiments, the content of the α-olefin unit is 25% by weight or more. In some embodiments, the content of the α-olefin unit is 30% by weight or more. It has been observed that a molded article's low-temperature impact strength increases when the content of the α-olefin unit is increased. The total content of the ethylene α-olefin units is 100% by weight. The content of the ethylene and α-olefin units can be determined by infrared spectroscopy.

The content of the nonconjugated diene units in the ethylene-α-olefin nonconjugated diene copolymer of component (C) can be 10% by weight or less per 100% by weight of the copolymer. In some embodiments, the content of the nonconjugated diene units is 5% by weight or less, per 100% by weight of the copolymer. The content of the nonconjugated diene units can be determined by infrared spectroscopy.

In some embodiments, the ethylene-α-olefin rubber of component (C) is an ethylene-propylene copolymer in which the content of ethylene units is from 50 to 80% by weight, and the content of propylene units is from 50 to 20% by weight per 100% by weight of the total of the ethylene units and the propylene units. In some embodiments, the ethylene-α-olefin rubber of component (C) is an ethylene-propylene-5-ethylidene-2-norbornene copolymer. In those embodiments, the content of the ethylene units is from 50 to 80% by weight, the content of a propylene units is from 50 to 20% by weight per 100% by weight of the total of the ethylene units and the propylene units, and the content of a 5-ethylidene-2-norbornene units is 10% by weight or less per 100% by weight of the polymer. In some embodiments, the ethylene-α-olefin rubber of component (C) is a mixture of these copolymers.

In some embodiments, component (C) has a Mooney viscosity ($ML_{1+4}$, 125° C.), measured at 125° C., of from 30 to 100. In some embodiments, component (C) has a Mooney viscosity of from 35 to 80. It has been observed that when component (C) has a Mooney viscosity of from 35 to 80, the molded articles has improved appearance, low-temperature impact strength and tensile breaking strength. The Mooney viscosity is measured in accordance with ASTM D-1646.

Ethylene-α-olefin copolymerized rubber of component (C) may be prepared using polymerization methods with catalysts for olefin polymerization. Examples include a slurry polymerization method, a solution polymerization method, a bulk polymerization method, and a vapor phase polymerization in which a complex catalyst such as a Ziegler-Natta catalyst, a metallocene complex, or a non-metallocene complex is used. It is also possible to use commercially available products.

Component (D) is a compound obtained by hydrogenating a block copolymer containing a block composed of an aromatic vinyl compound-based monomer unit (an aromatic vinyl compound unit) and a block composed of a conjugated diene compound-based monomer unit (a conjugated diene compound block). Examples of the aromatic vinyl compound include styrene, α-methylstyrene, o-methylstyrene, m-methylstyrene, p-methylstyrene, 1, 3-dimethylstyrene, vinylnaphthalene and vinylanthracene. In some embodiments, the aromatic vinyl compound is styrene. In some embodiments, the aromatic vinyl compound may be a combination of two or more armomatic vinyl compounds. In some embodiments, the aromatic vinyl compound is single compound. Examples of the conjugated diene compound include butadiene, isoprene, 1,3-pentadiene and 2,3-dimethyl-1,3-butadiene. In some embodiments, the conjugated diene compound is selected from butadiene and isoprene. The conjugated diene compounds may be used alone or in combination of two or more of them.

The content of the aromatic vinyl compound block in component (D) is from 15 to 40% by weight. In some embodiments, the content of the aromatic vinyl compound block is from 20 to 35% by weight. It has been observed that a molded product's mold releasability, appearance and low-temperature impact strength are improved when the content of the aromatic vinyl compound block is from 20 to 35% by weight. In some embodiments, the content of the conjugated diene compound block in component (D) is from 85 to 60% by weight. In some embodiments, the content of the conjugated diene compound block is from 80 to 65% by weight. The total amount of the aromatic vinyl compound block and the conjugated diene compound block is defined to be 100% by weight.

Component (D) may be a compound obtained by hydrogenating a diblock copolymer having an aromatic vinyl compound block-conjugated diene compound block structure or a compound obtained by hydrogenating a triblock copolymer having an aromatic vinyl compound block-conjugated diene compound block-aromatic vinyl compound block structure.

Component (D) is obtained by partially or completely hydrogenating double bonds of a conjugated diene compound-based monomer unit. In some embodiments, the hydrogenation rate (the amount of double bonds hydrogenated by a hydrogenation treatment) (assumed that an amount of double bonds of a conjugated diene compound-based monomer unit in a block copolymer before hydrogenation is 100%) can be 50% or more. In some embodiments, the degree of hydrogenation can be 80% or more. It has been observed that when the degree of hydrogenation is 80% or more, the molded article has improved light resistance (i.e. the ability to resist photo-oxidation) and heat resistance.

The weight average molecular weight of component (D) can be 50,000 or more. In some embodiments, the weight average molecular weight of component (D) is 120,000 or more. In some embodiments, the weight average molecular weight of component (D) is 250,000 or more. It has been observed that as the weight average molecular weight increases, the molded article's mold releasability and appearance improve. In some embodiments, the weight average molecular weight is 500,000 or less. It has been observed that molded articles with weight average molecular weights below 500,000 provided a thermoplastic elastomer composition with improved melt flowability. The weight average molecular weight is a weight average molecular weight of polystyrene equivalent and is measured by gel permeation chromatography (GPC).

Component (D) can be produced, for example, by a method in which a block copolymer is prepared as described in U.S. Pat. No. 3,265,765, which is incorporated herein by reference (Japanese Examined Patent Publication (Kokoku) No. 40-23798) and then the block copolymer is hydrogenated by the method described in Canadian Patent no. 815,575 and Australian Patent No. 6453173, which are incorporated herein by reference (Japanese Examined Patent Publication (Kokoku) No. 42-8704), U.S. Pat. No. 3,333,014, which is incorporated herein by reference (Japanese Examined Patent Publication (Kokoku) No. 43-6636), U.S. Pat. No. 4,501,857 which is incorporated herein by reference (Japanese Unexamined Patent Publication (Kokai) No. 59-133203 or Japanese Unexamined Patent Publication (Kokai) No. 60-79005).

Component (D) may also be obtained from commercially available products. Examples thereof include "KRATON-G (trade name)" manufactured by Kraton Polymers, "SEPTON (trade name)" manufactured by Kuraray Co., Ltd. and "Taftek (trade name)" manufactured by Asahi Kasei corporation.

In some embodiments, the thermoplastic elastomer composition contains components (A), (B), (C) and (D). The proportion of component (B) is from 10 to 100 parts by weight per 100 parts by weight of component (A). In some embodiments, the proportion of component (B) is from 15 to 90 parts by weight per 100 parts by weight of component (A). In some embodiments, the proportion of component (B) is from 20 to 80 parts by weight per 100 parts by weight of component (A).

The proportion of component (C) is from 50 to 200 parts by weight per 100 parts by weight of the component (A). In some embodiments, the proportion of component (C) is from 80 to 180 parts by weight per 100 parts by weight of component (A). In some embodiments, the proportion of component (C) is from 100 to 150 parts by weight per 100 parts by weight of component (A).

The proportion of component (D) is from 5 to 30 parts by weight per 100 parts by weight of the component (A). In some embodiments, the proportion of component (D) is from 8 to 25 parts by weight per 100 parts by weight of component (A). In some embodiments, the proportion of component (D) is from 10 to 20 parts by weight per 100 parts by weight of component (A).

The thermoplastic elastomer composition may contain inorganic fillers (talc, calcium carbonate, calcined kaolin, etc.), organic fillers (fiber, wood flour, cellulose powder, etc.), lubricants (silicone oil, silicone gum, etc.), antioxidants (phenol-, sulfur-, phosphorus-, lactone- and vitamin-based antioxidants), weathering stabilizers, ultraviolet absorbers (benzotriazole-, triazine, anilide- and benzophenone-based ultraviolet absorbers), heat stabilizers, light stabilizers (hindered amine- and benzoate-based light stabilizers), pigments, nucleating agents, adsorbents (metal oxide (zinc oxide, magnesium oxide, etc.), metal chloride (iron chloride, calcium chloride, etc.), hydrotalcite, aluminate, etc.). These optional ingredients may be included as long as they do not interfere with providing a suitable molded article that can be readily removed from a mold and have excellent appearance.

In some embodiments, the thermoplastic elastomer composition also contains a component (E). In some embodiments, component (E) can improve mold releasability and surface feeling of the molded article.

Component (E) is a compound selected from the group consisting of: fatty acids having 5 or more carbon atoms, metal salts of fatty acids having 5 or more carbon atoms, fatty acid amides having 5 or more carbon atoms, and esters of fatty acid having 5 or more carbon atoms.

Examples of the fatty acids having 5 or more carbon atoms include lauric acid, palmitic acid, stearic acid, behenic acid, oleic acid, erucic acid, linoleic acid, and ricinoleic acid.

Examples of the metal salts of fatty acid having 5 or more carbon atoms include salts of the above fatty acids and metals such as Li, Na, Mg, Al, K, Ca, Zn, Ba and Pb, and specific examples thereof include lithium stearate, sodium stearate, calcium stearate, and zinc stearate.

Examples of the fatty acid amides having 5 or more carbon atoms include lauric acid amide, palmitic acid amide, stearic acid amide, oleic acid amide, erucic acid amide, methylenebisstearic acid amide, ethylenebisstearic acid amide, ethylenebisoleic acid amide, and stearyl dimethanol amide. In some embodiments, the fatty acid amide is erucic acid amide.

Examples of the esters of fatty acid having 5 or more carbon atoms include the condensation product of esters of the fatty acids above and alcohols such as aliphatic alcohols (myristyl alcohol, palmityl alcohol, stearyl alcohol, behenyl alcohol, 12-hydroxystearyl alcohol, etc.), aromatic alcohols (benzyl alcohol, β-phenylethyl alcohol, phthalyl alcohol, etc.), polyhydric alcohols (glycerin, diglycerin, polyglycerin, sorbitan, sorbitol, propylene glycol, polypropylene glycol, polyethylene glycol, pentaerythritol, trimethylolpropane, etc.). Specific examples thereof include glycerin monooleate, glycerin dioleate, polyethylene glycol monostearate and citric acid distearate.

When component (E) is present, the proportion of component (E) is from 0.01 to 1.5 parts by weight per 100 parts by weight of the total amount of the components (A), (B), (C) and (D). In some embodiments, the proportion of component (E) is from 0.05 to 1 part by weight per 100 parts by weight of the total amount of the components (A), (B), (C) and (D).

The thermoplastic elastomer composition can be obtained by melt-kneading the components (A), (B), (C) and (D) and, if necessary, other components using a twin-screw extruder, a Bunbary mixer, or the like.

The thermoplastic elastomer composition can be formed into molded articles having various shapes by a known molding method, for example, an injection molding method, a compression molding method, or the like. In some embodiments, the thermoplastic elastomer composition can be formed into a molded article using an injection molding method.

In an injection molding, the temperature upon injection of the thermoplastic elastomer composition can be from 170 to 260° C. In some embodiments, the temperature upon injection can be from 190 to 240° C. It has been observed that an injection temperature of from 190 to 240° C. results in a molded article with an improved appearance.

In the injection molding, the mold temperature can be from 30 to 75° C. In some embodiments, the mold temperature is from 40 to 65° C. It has been observed that the molded articles have an improved appearance and mold releasability when the mold temperature is from 40 to 65° C.

In the injection molding, the rate of filling the thermoplastic elastomer composition into a mold (before dwell switching) can be from 10 g/second to 300 g/second. In some embodiments, the rate of filling can be from 30 g/second to 200 g/second. It has been observed that the molded article has an improved appearance when the rate of filling is from 30 g/second to 200 g/second.

In the injection molding, the pressure and time applied in a dwelling step after injection and filling are such that allow a limited amount of the molten thermoplastic elastomer composition to be filled in a mold during pressure maintaining to improve appearances of the shaped article. In some embodiments, the pressure and time applied are such that the amount of the molten thermoplastic elastomer composition to be filled in a mold during dwelling is 10% by weight or less based on 100% by weight of the molded article. In some embodiments, the pressure and time applied are such that the amount of the molten thermoplastic elastomer composition to be filled in a mold during dwelling is 7% by weight or less.

The molded article obtained by injection molding of the thermoplastic elastomer composition is suitably used as automobile interior materials, and particularly used as air bag covers. Examples of the air bag cover include an air bag cover for driver, an air bag cover for passenger, a side air bag cover, a knee air bag cover, and a curtain air bag cover.

EXAMPLES

The following examples and comparative examples are illustrative.

I. Measurement and Evaluation

1. Melt Flow Rate (MFR, unit: g/10 min)

Melt flow rate was measured under the conditions of a temperature of 230° C. and a load of 21.18 N in accordance with JIS K7210.

2. Mooney Viscosity ($ML_{1+4}$)

Mooney viscosity was measured in accordance with ASTM D1646.

3. Contents of Ethylene Unit, Propylene Unit and 5-ethylindene-2-norbornene Unit (unit: % by weight)

An amount of a monomer unit was measured by infrared spectroscopy.

4. Melting Temperature (unit: ° C.)

A differential scanning calorie curve was measured under the following measuring conditions by a heat flux type differential scanning calorimeter (DSC RDC220, manufactured by Seiko Instruments Inc.) and a melting temperature was determined from the differential scanning calorie curve in a temperature rising operation.

Measuring Conditions

Temperature falling operation: After melting at 220° C., temperature falling was carried out within a range from 220 to −90° C. at a temperature falling rate of 5° C./min.

Temperature rising operation: Immediately after the temperature falling operation, temperature rising was carried out within a range from −90 to 200° C. at a temperature rising rate of 5° C./min.

5. Heat of Crystallization (ΔH, Unit: mJ/mg)

A differential scanning calorie curve was measured under the following measuring conditions by a heat flux type differential scanning calorimeter (DSC RDC220, manufactured by Seiko Instruments Inc.) and the heat crystallization was determined from an area of the portion surrounded by the resulting differential scanning calorie curve and a base line.

Measuring Conditions

Temperature falling operation: After melting at 220° C., temperature falling was carried out within a range from 220 to −90° C. at a temperature falling rate of 5° C./min 6. Threo Form (—CHCH3-CHCH3 Structure)

A $^{13}$C-NMR spectrum of a polymer was measured by a carbon nuclear magnetic resonance method ($^{13}$C-NMR). In the resulting $^{13}$C-NMR spectrum, it was examined whether or not a signal exists at about 15 ppm.

Measuring Conditions

Apparatus: ARX600 manufactured by Bruker

Measuring solvent: mixed solvent of 1,2-dichlorobenzene and 1,2-dichlorobenzene-d4 (mixing ratio of 80/20)

Sample concentration: 300 mg/3 ml solvent

Measuring temperature: 135° C.

Measuring mode: Proton decoupling method

Pulse width: 45 degree

Pulse repeating time: 4 seconds

Integrating time: 3,000 times

Measuring standard: Tetrahydrosilane

7. Intrinsic viscosity ("ηcxs", "ηcxis", unit: dl/g)

Using an Uberhode-type viscometer, intrinsic viscosity was measured at 135° C. using tetralin as a solvent.

8. Weight Average Molecular Weight

Using a gel permeation chromatograph (GPC) method, a molecular weight distribution curve was measured under the following conditions (1) to (8) and the weight average molecular weight was determined from the resulting molecular weight distribution curve.

(1) Apparatus: Waters 150C manufactured by Waters Corporation
(2) Separation column: TOSOH TSKgelGMH6-HT
(3) Measuring temperature: 140° C.
(4) Carrier: ortho-dichlorobenzene
(5) Flow rate: 1.0 ml/min
(6) Injection amount: 500 μL
(7) Detector: differential refractometry
(8) Molecular weight standard substance: standard polystyrene 9. Content of Styrene Unit of Hydrogenated Styrene-Conjugated Diene-Styrene Block Copolymer A $^{13}$C-NMR spectrum of a hydrogenated copolymer was measured by a carbon nuclear magnetic resonance ($^{13}$C-NMR) method. In the resulting $^{13}$C-NMR spectrum, a content of a styrene unit was determined from the resulting $^{13}$C-NMR spectrum.

Measuring Conditions

Apparatus: ARX600 manufactured by Bruker
Measuring solvent: mixed solvent of 1,2-dichlorobenzene and 1,2-dichlorobenzene-d4 (mixing ratio of 80/20)
Sample concentration: 300 mg/3 ml solvent
Measuring temperature: 130° C.
Measuring mode: Proton decoupling method
Pulse width: 45 degree
Pulse repeating number: 4 seconds
Integrating time: 3,000 times
Measuring standard: Tetramethylsilane 10. Low-Temperature Impact Strength Using a 2 mm thick test piece cut out from a plate-shaped injecting molded article, an impact test was carried out at a temperature of −40° C. in accordance with JIS K7110. The case where the test piece was broken was indicated as "B", whereas, the case where the test piece was not broken was indicated as "NB".

11. Mold Releasability of Injection Molded Article

Ease of removal of a molding portion and a sprue portion of a box-shaped injection molded article from a mold was evaluated as follows:

"O": A molding portion and a sprue portion can be easily removed from a mold.

"x": It takes a slight longer time to remove a molding portion or a sprue portion from a mold.

12. Gloss of Injection Molded Article

Using a plate-shaped injecting molding as a test piece, a 60 degree specular gloss was measured in accordance with JIS K7105. As a measuring apparatus, a digital variable angle gloss meter UGV-5DP manufactured by Suga Test Instruments Co., Ltd was used.

13. Luster Unevenness of Injection Molding

Appearance of a box-shaped injection molded article was visually observed and a state of generation of flow mark and a state of luster unevenness of a tear line portion were evaluated as follows:

"O": Good
"x": Poor
"Δ": Rating between Good and Poor

II. Samples

1. Polypropylene Resin

A: Multistage-polymerized resin by propylene homopolymerization/propylene-ethylene copolymerization
NMR=56 g/10 min,
content of component (A1)=87% by weight,
content of component (A2)=13% by weight,
content of propylene unit of component (A1)=100% by weight, content of ethylene unit of component (A2)=40% by weight, melting temperature=163.5° C., [ηcxs]/[ηcxis]=4.4, Signals attributed to two methyl carbons of threo form (—CHCH$_3$—CHCH$_3$) are not detected.

2. Crystalline Propylene-Ethylene Copolymer

B: (Melt Flow Rate (MFR)=25 g/10 min, content of ethylene unit=5.3% by weight, melting temperature: 114.5° C., heat of crystallization (ΔH)=70 mJ/mg, signals attributed to two methyl carbons of threo form (—CHCH$_3$—CHCH$_3$) are detected) (peak area of peak at high magnetic field/peak area of peak at low magnetic field=0.99).

3. Ethylene-α-Olefin Rubber

C-1: Ethylene-propylene-5-ethylidene-2-norbornene copolymer (Mooney viscosity (ML$_{1+4}$, 125° C.)=61, content of ethylene unit/content of propylene unit=67% by weight/33% by weight, content of 5-ethylidene-2-norbornene unit=0.5% by weight)

C-2: Ethylene-Propylene Copolymer
(Mooney viscosity (ML$_{1+4}$, 125° C.)=44, content of ethylene unit/content of propylene unit=62% by weight/38% by weight)

C-3: Ethylene-Propylene Copolymer
(Mooney viscosity (ML$_{1+4}$, 125° C.)=48, content of ethylene unit/content of propylene unit=51% by weight/49% by weight)

4. Hydrogenated Styrene-Conjugated Diene-Styrene Block Copolymer

D-1: Hydrogenated styrene-butadiene-styrene block copolymer (weight average molecular weight: 320,000, content of styrene unit: 29% by weight)

D-2: Hydrogenated styrene-butadiene-styrene block copolymer (weight average molecular weight: 101,000, content of styrene unit: 29% by weight)

D-3: Hydrogenated styrene-butadiene-styrene block copolymer (weight average molecular weight: 139,000, content of styrene unit: 12% by weight)

Example 1

Thermoplastic Elastomer Composition 100 parts by weight of a polypropylene resin A, 30 parts by weight of a crystalline propylene-ethylene copolymer B, 107.5 parts by weight of an ethylene-α-olefin copolymer C-1, 12.5 parts by weight of a hydrogenated styrene-conjugated butadiene-styrene block copolymer D-1, 0.125 part by weight of erucic acid amide (manufactured by Nippon Fine Chemical under the trade name of NEUTRON S), 0.375 parts by weight of an antioxidant (0.25 part by weight of Sumilizer GA80 manufactured by Sumitomo Chemical Co., Ltd. and 0.125 part by weight of IRGAFOS 168 manufactured by Ciba Specialty Chemicals k.k.) and 2.5 parts by weight of a black pigment (manufactured by Sumitomo Color Co., Ltd. under the trade name of SPEC 824) were blended and then melt-kneaded by a Bunbary mixer to obtain a thermoplastic elastomer composition.

Injection Molding for Evaluation of Physical Properties

The thermoplastic elastomer composition was formed into a plate-shaped injection molded article measuring 90 mm in length, 150 mm in width and 2 mm in thickness under the conditions of a cylinder temperature of 220° C. and a mold temperature of 50° C. by an injection molding machine (manufactured by TOSHIBA MACHINE CO., LTD. under the trade name of EC160NII).

The thermoplastic elastomer composition was formed into a box-shaped injection molded article with a tear line portion having a thickness of 0.5 mm under the conditions of a cylinder temperature of 220° C. and a mold temperature of 35° C. The evaluation results of the resulting injection molded articles are shown in Table 1.

Example 2

In the same manner as in Example 1, except that an ethylene-α-olefin copolymer C-2 was used in place of the ethylene-α-olefin copolymer C-1. Evaluation results of the resulting molded article are shown in Table 1.

Example 3

In the same manner as in Example 1, except that an ethylene-α-olefin copolymer C-3 was used in place of the ethylene-α-olefin copolymer C-1. Evaluation results of the resulting molded article are shown in Table 1.

Example 4

In the same manner as in Example 1, except that a hydrogenated styrene-conjugated diene-styrene block copolymer D-2 was used in place of the hydrogenated styrene-conjugated diene-styrene block copolymer D-1. Evaluation results of the resulting molded article are shown in Table 1.

Comparative Example 1

In the same manner as in Example 1, except that a hydrogenated styrene-conjugated diene-styrene block copolymer D-3 was used in place of the hydrogenated styrene-conjugated diene-styrene block copolymer D-1. Evaluation results of the resulting molded article are shown in Table 1.

Comparative Example 2

In the same manner as in Example 1, except that 70 parts by weight of the ethylene-α-olefin copolymer C-1 and 50 parts by weight of the hydrogenated styrene-conjugated diene-styrene block copolymer D-1 were used. Evaluation results of the resulting molded article are shown in Table 1.

Comparative Example 3

In the same manner as in Example 1, except that 150 parts by weight of the ethylene-α-olefin copolymer C-1 was used and the crystalline propylene-ethylene copolymer B and the hydrogenated styrene-conjugated diene-styrene block copolymer D-1 were omitted. Evaluation results of the resulting molded article are shown in Table 1.

Comparative Example 4

In the same manner as in Example 1, except that a hydrogenated styrene-conjugated diene-styrene block copolymer D-2 was used in place of the hydrogenated styrene-conjugated diene-styrene block copolymer D-1, 137.5 parts by weight of the ethylene-α-olefin copolymer C-1 was used, and the crystalline propylene-ethylene copolymer B was not used. Evaluation results of the resulting molded article are shown in Table 1.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Composition of polymer |  |  |  |  |  |  |  |  |  |
| A | Parts by weight | 100 | 100 | 100 | 100 | 100 | 100 | 100 | 100 |
| B | Parts by weight | 30 | 30 | 30 | 30 | 30 | 30 |  |  |
| C-1 | Parts by weight | 107.5 |  |  | 107.5 | 107.5 | 70 | 150 | 137.5 |
| C-2 | Parts by weight |  | 107.5 |  |  |  |  |  |  |
| C-3 | Parts by weight |  |  | 107.5 |  |  |  |  |  |
| D-1 | Parts by weight | 12.5 | 12.5 | 12.5 |  |  | 50 |  |  |
| D-2 | Parts by weight |  |  |  | 12.5 |  |  |  | 12.5 |
| D-3 | Parts by weight |  |  |  |  | 12.5 |  |  |  |
| Composition |  |  |  |  |  |  |  |  |  |
| MFR | g/10 min | 5 | 6 | 6.5 | 6.5 | 8.5 | 1.5 | 4.5 | 4.5 |
| Injected molding |  |  |  |  |  |  |  |  |  |
| Low-temperature impact strength |  | NB | NB | NB | NB | NB | NB | NB | NB |
| Mold releasability |  | ○ | ○ | ○ | ○ | x | ○ | x | x |
| Appearance |  |  |  |  |  |  |  |  |  |
| Gloss | % | 42 | 60 | 61 | 63 | 74 | 39 | 46 | 61 |
| Luster unevenness |  | ○ | ○ | ○ | ○ | Δ | Δ | x | x |

The invention claimed is:

1. A thermoplastic elastomer composition comprising components (A), (B), (C), and (D);
   wherein the ratio of (B):(A) is from 1:1 to 1:10, the ratio of (C):(A) is from 1:2 to 2:1, the ratio of (D):(A) is from 1:20 to 3:10;
   wherein component (A) is a propylene polymer comprising from 70 to 95% by weight of component (A1) and from 30 to 5% by weight of component (A2),
   and wherein component (A1) is selected from the group consisting of: propylene homopolymer, propylene copolymer, and a mixture of propylene homopolymer and propylene copolymer,
   wherein the propylene copolymer comprises propylene units and monomer units, the monomer units being at least one of ethylene and an α-olefin having 4 or more carbon atoms, and containing 90% or more by weight of propylene units per 100% by weight of component (A1);
   and wherein component (A2) is an ethylene-α-olefin copolymer comprising from 20 to 50% by weight of ethylene units per 100% by weight of the component (A2);
   wherein component (B) is a crystalline propylene-ethylene copolymer consisting of from 70 to 97% by weight of propylene units (B1), and from 30 to 3% by weight of ethylene units (B2);
   wherein component (C) is an ethylene-α-olefin rubber comprising from 50 to 80% by weight of ethylene units (C1), and from 50 to 20% by weight of α-olefin units (C2);
   wherein the component (D) is a hydrogenated product of a block copolymer comprising from 15 to 40% by weight of aromatic vinyl compound units (D1), and from 85 to 60% by weight of conjugated diene compound units (D2), and wherein the weight average molecular weight of component (D) is 250,000 or more.

2. The thermoplastic elastomer according to claim 1, further comprising component (E), wherein component (E) is selected from the group consisting of:
   a fatty acid having 5 or more carbon atoms, metal salts of a fatty acid having 5 or more carbon atoms, fatty acid amides having 5 or more carbon atoms, and esters of fatty acids having 5 or more carbon atoms; and wherein the ratio of E to the sum of components (A), (B), (C) and (D) is from 1:10,000 to 15:1,000.

3. The thermoplastic elastomer composition according to claim 1, wherein component (B) is a crystalline propylene-ethylene copolymer having threo type structure.

4. The thermoplastic elastomer according to claim 1, wherein component (A) has a [ηcxs] to [ηcxis] ratio from about 1.3 to about 8, where [ηcxs] is intrinsic viscosity (135° C., tetraline) of at 20° C. xylene solubles of component (A), and [ηcxis] is intrinsic viscosity (135° C., tetraline) of xylene insolubles at 20° C. of component (A).

5. The thermoplastic elastomer according to claim 1, wherein component (C) has a Mooney Viscosity of 30 to 100 ($ML_{1+4}$, 125° C.).

6. The thermoplastic elastomer according to claim 1, wherein the total amount of (A1)) and (A2) is 100% by weight of component (A), the total amount of (B1) and (B2) is 100% by weight of component (B), the total amount of (C1) and (C2) is 100% by weight of component (C), and the total amount of (D1) and (D2) is 100% by weight of component (D).

7. A thermoplastic elastomer composition comprising:
   from about 23 to about 61% by weight of component (A);
   from about 2 to about 60% by weight of component (B);
   from about 11 to about 47% by weight of component (C);
   from about 1 to about 19% by weight of component (D);
   wherein component (A) is a propylene polymer comprising from 70 to 95% by weight of component (A1) and from 30 to 5% by weight of component (A2),
   and wherein component (A1) is selected from the group consisting of: propylene homopolymer, propylene copolymer, and a mixture of propylene homopolymer and propylene copolymer,
   wherein the propylene copolymer comprises propylene units and monomer units, the monomer units being at least one of ethylene and an α-olefin having 4 or more carbon atoms, and containing 90% or more by weight of propylene units per 100% by weight of component (A1);
   and wherein component (A2) is an ethylene-α-olefin copolymer comprising from 20 to 50% by weight of ethylene units per 100% by weight of the component (A2);
   wherein component (B) is a crystalline propylene-ethylene copolymer consisting of from 70 to 97% by weight of propylene units (B1), and from 30 to 3% by weight of ethylene units (B2);
   wherein component (C) is an ethylene-α-olefin rubber comprising from 50 to 80% by weight of ethylene units (C1), and from 50 to 20% by weight of α-olefin units (C2);
   wherein the component (D) is a hydrogenated product of a block copolymer comprising from 15 to 40% by weight of aromatic vinyl compound units (D1), and from 85 to 60% by weight of conjugated diene compound units (D2), and wherein the weight average molecular weight of component (D) is 250,000 or more.

8. The thermoplastic elastomer according to claim 7, further comprising component (E), wherein component (E) is selected from the group consisting of:
   a fatty acid having 5 or more carbon atoms, metal salts of a fatty acid having 5 or more carbon atoms, fatty acid amides having 5 or more carbon atoms, and esters of fatty acids having 5 or more carbon atoms; and wherein component (E) is present up to about 1% by weight.

9. The thermoplastic elastomer composition according to claim 7, wherein component (B) is a crystalline propylene-ethylene copolymer having threo type structure.

10. The thermoplastic elastomer according to claim 7, wherein component (A) has a [ηcxs] to [ηcxis] ratio from about 1.3 to about 8, where [ηcxs] is intrinsic viscosity (135° C., tetraline) of at 20° C. xylene solubles of component (A), and [ηcxis] is intrinsic viscosity (135° C., tetraline) of xylene insolubles at 20° C. of component (A).

11. The thermoplastic elastomer according to claim 7, wherein component (C) has a Mooney Viscosity of 30 to 100 ($ML_{1+4}$, 125° C.).

12. The thermoplastic elastomer according to claim 7, wherein the total amount of (A1) and (A2) is 100% by weight of component (A), the total amount of (B1) and (B2) is 100% by weight of component (B), the total amount of (C1) and (C2) is 100% by weight of component (C), and the total amount of (D1) and (D2) is 100% by weight of component (D).

13. The thermoplastic elastomer according to claim 7, wherein component (D) is present at about 1 to about 10% by weight.

* * * * *